(12) United States Patent
Menashes (10) Patent No.: US 8,960,579 B2
(45) Date of Patent: Feb. 24, 2015

(54) UNIVERSAL BLADES AND ACCESSORIES FOR FOOD PROCESSORS

(76) Inventor: David Menashes, Haifa (IL)

(*) Notice: Subject to any disclaimer, the term of this patent is extended or adjusted under 35 U.S.C. 154(b) by 480 days.

(21) Appl. No.: 13/337,412

(22) Filed: Dec. 27, 2011

(65) Prior Publication Data

US 2012/0091245 A1 Apr. 19, 2012

Related U.S. Application Data

(63) Continuation-in-part of application No. PCT/IL2010/000510, filed on Jun. 24, 2010.

(60) Provisional application No. 61/219,787, filed on Jun. 24, 2009.

(51) Int. Cl.
*A47J 43/046* (2006.01)
*A47J 43/07* (2006.01)

(52) U.S. Cl.
CPC .................................. *A47J 43/0722* (2013.01)
USPC ................... 241/101.1; 241/101.2; 241/282.2

(58) Field of Classification Search
USPC ....................... 241/282.1, 282.2, 101.2, 101.1
See application file for complete search history.

(56) References Cited

U.S. PATENT DOCUMENTS

| 4,752,041 A | 6/1988 | Franke et al. |
| 6,299,085 B1 | 10/2001 | Ekstroem |
| 2004/0056130 A1 | 3/2004 | Gursel |
| 2009/0114616 A1 | 5/2009 | White et al. |

FOREIGN PATENT DOCUMENTS

| DE | 29612865 U1 | 11/1996 |
| GB | 1037179 | 12/1962 |
| IL | 201000510 | 3/2011 |
| JP | 55163938 | 4/1954 |
| JP | 56155734 | 4/1955 |
| JP | 5539062 | 9/1983 |
| JP | 6440442 U | 3/1989 |
| JP | 261446 | 5/1990 |
| JP | 11244159 A | 8/1999 |
| WO | 200728153 A1 | 11/2007 |

*Primary Examiner* — Mark Rosenbaum
(74) *Attorney, Agent, or Firm* — William H. Dippert; Eckert Seamans Cherin & Mellott, LLC (57) ABSTRACT

Food processing utensil comprising: paddles, central utensil comprising: shaft coupleable to food processor motor, and connected to base coupleable to food processor bowl, and cutting blades, the paddles coupled to the central utensil and the blades configured to allow uniform cutting of food, providing paddles are not on blades.

17 Claims, 10 Drawing Sheets

UNIVERSAL BLADES AND ACCESSORIES FOR FOOD PROCESSORS

CROSS-REFERENCE TO RELATED APPLICATIONS

This application is a continuation-in-part of co-pending PCT Patent Application No. PCT/IL2010/000510, filed Jun. 24, 2010, which is based upon and claims the benefit of U.S. Provisional Application Ser. No. 61/219,787, filed Jun. 24, 2009, the entire contents of both of which are incorporated herein by reference as if fully set forth herein.

FIELD OF THE INVENTION

The present invention relates to utensils and accessories for food processors. More particularly, the present invention relates to a universal blade composed of a plurality of elements capable of efficiently and effectively chopping dry and wet food, or mixing, steering, whipping, grinding and blending food.

BACKGROUND OF THE INVENTION

There are many activities performed on greatly different types of material in the kitchen, and for each type of activity as well as each type of material, a different utensil may be commercially available.

However, such numerous and various utensils may each require optimization, or at least improvement, or combination with each other to save space, costs, etc. In addition, it would be desirable that the utensils be useful both separately and in combination. Some combinations may even produce a new effect as a result of operating the combination.

One of the options for combining utensils is utensils bearing different types of blades, see for example US 2008198691 to Sunbeam Products Inc., that describes a blade assembly suited for both blending and food processing in small throat blender jars. The blade assembly includes a plurality of blade forms each designed to perform a specific blending or processing task while simultaneously working together and with the geometric restrictions of the jar to optimize the assembly's capability to crush ice, blend or mix liquids and/or semi-solid materials, and to chop, cut, or slice solid food items.

U.S. Pat. No. 7,419,111 to Euro-Pro Operating, LLP, describes a multi-blade food processing apparatus having two independent blade assemblies, each of the blade assemblies having two opposed horizontal cutting blades, wherein the upper independent blade assembly is selectively removable from the apparatus. The blade assemblies are positioned at 90 degrees from each other but may include additional positions for orienting the blades at any angle with respect to each other.

U.S. Pat. No. 5,839,826 to Sunbeam products Inc. describes a blender blade having a bottom wavy or undulate configuration for blending ingredients in a blender and a top aerating blade. The wavy blade stirs ingredients into the mixture, rather than chopping and grinding the ingredients, thereby retaining the ingredients integrity. The top blade pulls ingredients and air into the mixture to be mixed. The resultant mixture has a heterogeneous, rather than homogenous, and textured consistency.

Despite the multi-bladed structure of these and other utensils, and even despite the multi-angled/multi-oriented/multi-surfaced structures of blades in some processors, a common problem in food processors is their limited capability to allow the blades to efficiently and evenly go through all layers in the food preparation, thus creating isolated mixing zones of varying contents/particle sizes/consistencies; in other words, the blades tend to go through the layer on their height and perhaps a bit below and above, but layers considerably lower and higher than the blades tend to linger beyond the blades such that the food preparation is not homogeneous and not evenly cut.

Such problems might be exacerbated in food preparations including finely divided dry solids, herbs, and low-density fluids, such as oily fluids, that often float on the surface of the stirred and cut preparation. Such preparations require good top-to-bottom circulation.

It will also occur that particular materials, such as highly viscous and dense materials, may be particularly problem materials that are poorly processed by commercially available systems. Conversely, as discussed in U.S. Pat. No. 2,964,301 to E. I. du Pont de Nemours and Company, agitators designed to operate at a fixed (high) speed in viscous fluids produce too violent mixing in low-viscosity materials, which might cause loss of material, messy utensils etc.

Therefore, we have recognized a need for more adaptable, thorough, and preferably efficient and controlled processing of food preparations.

Accordingly, it is desirable to provide a simple yet adaptable food processing apparatus having a blade configuration as well as convecting elements to improve chopping and/or aeration uniformity, homogeneity and efficiency for example, and provide more activities with a single utensil, optionally including an accessory for fuller adaptability to different types and amounts of food preparations. Additionally, we have also recognized a need for allowing more efficient whipping (more efficient introduction of air) of food stuffs than is currently available.

One object of the present invention to provide a universal blade apparatus composed of several elements that can be mounted together in a food processor and that is capable of manipulating and preparing many different types of food commonly prepared by many different kinds of tools such as coffee grinder, blander, meat chopper, juicer, etc.

BRIEF DESCRIPTION OF THE FIGURES

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appended Description and Claims.

SUMMARY OF INVENTION

According to one aspect, a food processor for concomitantly stirring, whipping and/or chopping food preparations is provided, the food processor comprising:
a motor; a bowl with a bottom and walls, and a food processing utensil, the utensil comprising:
  at least one paddle;
  at least one wing;
  at least one blade having free ends, and
  a central utensil comprising: a two-ended shaft and a base, the shaft culminating on a first end with a spindle operationally coupleable to a food processor motor, and connected on the second end to a base coupleable to a food processor bawl, and the paddles, blades and wings coupled to the central utensil and the blades configured such that when the bowl is filled with a food preparation to at least the level of the paddle, and the central utensil is coupled to the motor and the bowl and then rotated in the food preparation around a rotational axis, the food is uniformly cut and/or whipped In some embodiments, the paddles are on the base of the central utensil.

Some embodiments further comprise at least one cutting and/or stirring accessory, the accessories each comprising at least one of the elements: blades, paddles and wings, the accessories and central utensil each further comprising means to securely couple each accessory to the central utensil.

The blades are preferably further configured to maintain balance of the food processing utensil during operation of a food processor comprising the food processing utensil. For example, in particular embodiments at least one set of blades comprises geometrically different blades, and then the geometrically different blades are preferably differently sized and/or positioned to maintain balance of the food processing utensil.

The geometrical difference may comprise for example one or more of the group comprising: contour and angle with respect to the axis of rotation of the food processing utensil. For example, the blades in the set of geometrically different blades may differ in their width and/or thickness.

In some embodiments the free ends of the lowest blade/s are no more than 5 mm away from the walls and bottom of the food processing bowl.

In some embodiments, the bottom of the bowl has a wave-like structure:

The food processing utensil may further comprise a brush accessory, the accessory comprising bristles, the accessory and central utensil further comprising means to securely couple each other.

In some embodiments, means for coupling comprises a spiral slit on the central utensil shaft that enables an accessory to downwardly slide in a spiral manner during rotation of the food processing utensil.

Preferably, the utensil is further configured to allow obtaining within a few seconds of operating the food processor a coarsely cut food preparation, and within a longer period of time a finer cut but similarly uniformly sized food preparation.

DETAILED DESCRIPTION

The invention relates to improved food processing utensils and accessories to aid in the preparation of food or liquids, that will be performing food processing activities such as but not limited to: chopping, mixing, stirring, whisking, squeezing, straining, whipping and many other food preparation activities as will be described hereafter.

An object of the invention is to provide a food processing utensil that will replace the common appliances similar to a food processor, juicer, blender, mixer, and other appliances as such. The embodiments described herein utilize advanced utilities and accessories to perform all the functionalities with the use of a single utensil.

A further object of the invention is to provide a multi function unique blade for the purpose of food processing.

A further object of the invention is to provide an innovative bowl to aid with the creation of whipped foam, and finely ground or chopped food particles.

A further object of the invention is to provide a food straining device to separate the liquids from the solid food particles.

These together with additional objects, features and advantages of the food processing utensil will be readily apparent to those of ordinary skill in the art upon reading the following detailed description, and viewing the illustrative, embodiments of the food processing utensil when taken in conjunction with the accompanying drawings.

In this respect, before explaining the current embodiments of the food processing utensil in detail, it is to be understood that the food processing utensil is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food processing utensils. It is therefore important that the claims be regarded as including such equivalent construction insofar as they do not depart from the spirit and scope of the food processing utensils. It is also to be understood that the phraseology and terminology employed herein are for purposes of description and should not be regarded as limiting.

The invention relates to utensils that may concomitantly both stir and chop food preparations. The stirring may be of layers of the preparation such that food both below and above the blades, preferably throughout the food preparation place in a food processor or blender, has similar, preferably identical, consistency and composition as of the food in the layer through which the blades pass through.

Alternatively or additionally, the utensils may stir or introduce air into the food preparation, which may produce results similar to those obtained as a result of using a commercially available manual or electrical whisk on the preparation, yet preferably the results are obtained within a much shorter time.

Reference is now made to the figures representing different combinations of utensils that are capable of being fitted in a food processor or blender.

Figure 1:
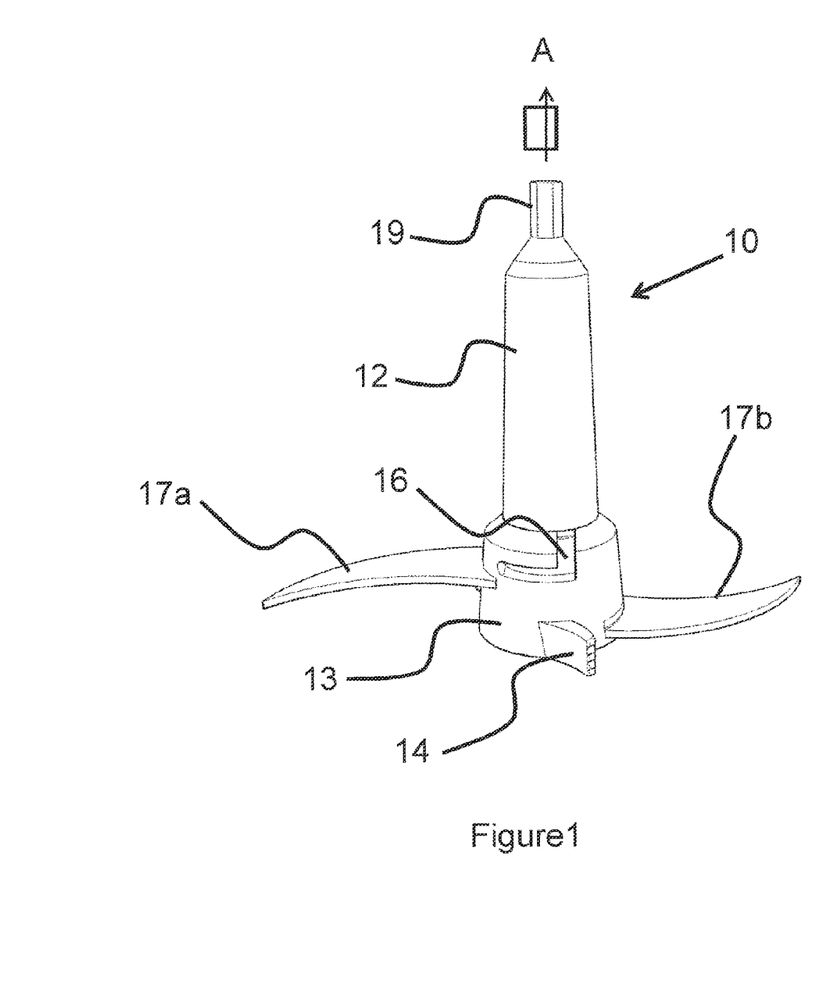
FIG. 1 illustrates a central utensil capable of being fitted in a food processor, the utensil including blades and a paddle, in accordance with some embodiments.

FIG. 1 illustrates a central utensil 10 that is capable of being fit into a food processor in accordance with some embodiments. The utensil 10' includes the following parts: a shaft 12 with a spindle 19, a base 13', paddle elements 14', slot 16', and cutting blades 17α', 17β'.

However, as will later be further explained, in other embodiments the central utensil may include more or less parts, for example simpler utensils that lack a slot, or utensils that have more than one pair of paddies, for example.

The shaft 12' is positioned to receive rotational power on its upper side from a motor of a food processor (not shown in the figures). The base 13' may be placed on the bottom of a food processor bowl (not shown in the figures).

Central utensil 10 includes a pair of paddle elements 14' capable of assisting in mixing the mixture (one of the pair is hidden from view).

Such paddles may have various forms, such as spoon, paw (as shown in the figure), shaft with blade such as in oars etc., and may be formed of more than one material, such as a central skeleton configure for carrying the greater majority of the stress and an outer skin capable of providing a greatly increased amount of impact resistance. Although in theory paddles may be placed on the blades, it is believed that the result of doing so may impair the performance of the blades, which are no longer streamlined, as well as superfluously complicating the manufacture of the blades. In other words, the paddles preferably extend from the base and not from the blades.

The slot 16' allows secure engagement of additional accessories with the shaft 12'.

Central utensil 10' is equipped with a pair of cutting blades 17α', 17β' projecting radially from base 13' with respect to the axis A of rotation of the utensil, in accordance with different embodiments.

Cutting blades pair 17' is capable of chopping wet and dry food including but not limited to meat or fish and may also be capable of crushing ice.

The paddles 14' may assist in bringing circulating material, such that cut material adjacent to the blade pair 17' may constantly be distributed radially outwards and be replaced by uncut material coming towards the blade pair 17'.

Shaft 12' includes a spindle 19' at its top to allow transfer of torque from the motor of the food processor to the central utensil 10'.

The central utensil can be mounted in a food processor in which the rotational force is applied from the top. Yet, to a person skilled in the area it should be clear and simple to adapt the central utensil to be used in a food processor where the rotation force is applied from the bottom side.

Figure 2:
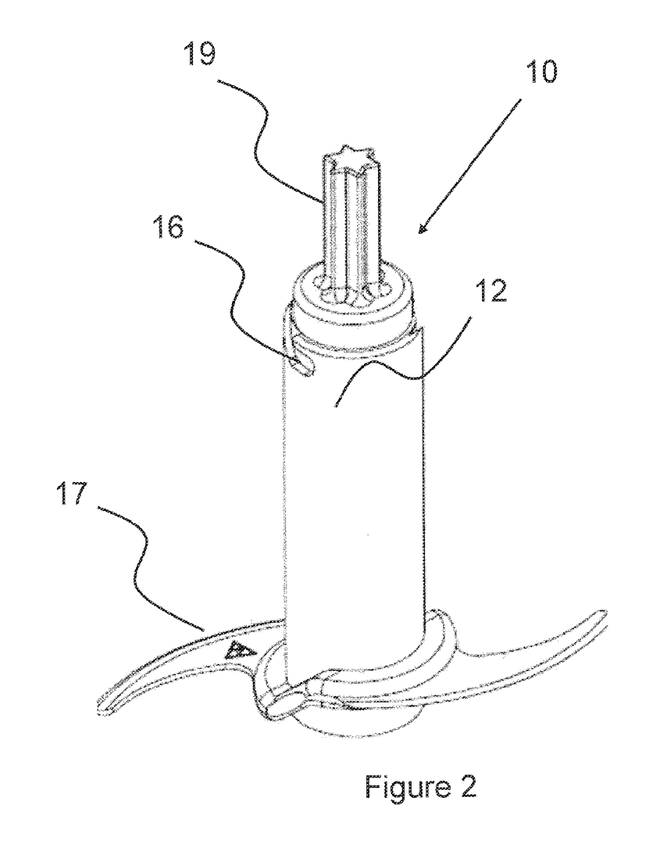
FIG. 2 illustrates another central utensil capable of being fitted in a food processor, the utensil including blades, in accordance with a preferred embodiment, and configured to be coupleable to a cutting and stirring accessory, in accordance with other embodiments.

Reference is now made to FIG. 2 illustrating another central utensil 10 that is capable of being fitted in a food processor in accordance with some embodiments. The utensil 10 includes the following parts: a shaft 12 with a spindle 19, a base 13, slot 16, and cutting blade pair 17. However, note that in contrast to the other embodiment 10 illustrated in FIG. 1, this central utensil 10 lacks paddle elements.

Figure 3:
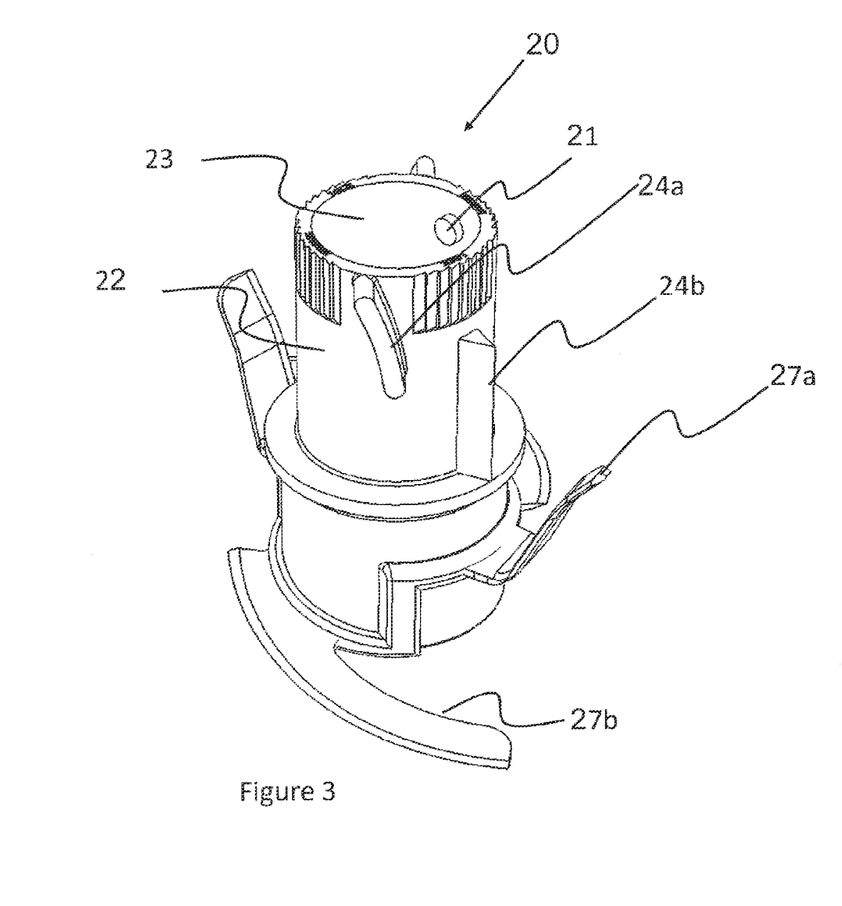
FIG. 3 illustrates a stirring and cutting accessory suitable for securely mounting on a central utensil such as in FIG. 2, in accordance with some embodiments.

FIG. 3 illustrates a cutting, stirring and whisking accessory 20 capable of being secured to a central utensil such as the utensil 10, shown in FIG. 2, in accordance with some embodiments.

Accessory 20 includes a cylindrically shaped body 22 with an opening 23, a pair of wings 24a, a pair of paddles 24b and a locking key 21.

Opening 23 is preferably configured to snugly fit the accessory 20 onto shaft 12. In addition, the locking key 21 is configured to engage slot 16 such that the accessory 20 is secured to the central utensil 10.

Wings 24a may be configured so that when submerged in the stirred preparation they are capable of disrupting mixing zones of the preparation and thus enhancing circulation of these zones, to be further processed and thus helping to enable generation of a relatively homogeneous and uniformly cut mixture.

Wings 24a may also or alternatively be configured so that when being situated closely above the surface of the stirred preparation, they allow circulation of air into the food preparation, similar to the effect of the operation of a whisk.

Paddles 24b may be configured to assist in stirring the preparation, as will further be explained below.

The stirring and cutting accessory 20 further includes two pairs of cutting blades 27a and 27b.

Cutting blade pairs 27a, 27b are each designed to be located in different heights relative to the bottom of the food processor's bowl (not shown) for cutting food at different levels of the food preparation, and may have different sizes and orientation, angles and/or shapes to cut food particles of different sizes or consistencies or to cut into different sizes and shapes, and may work in a complementary or synergic manner to each other to optimize cutting of the contents of the preparation.

In some other embodiments more than one cutting and/or stirring accessories may be provided that are separately mountable on a central utensil and some of the separately mountable accessories may be combined on a central utensil.

Figure 4:
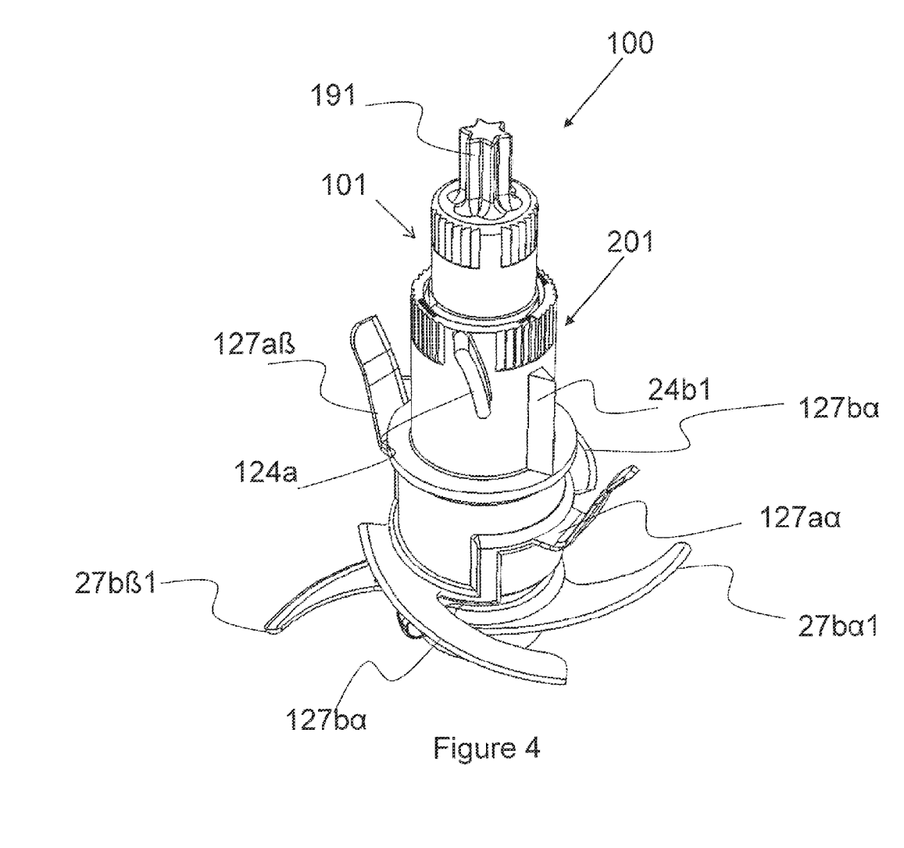
FIG. 4 illustrates a perspective view of a food processing utensil assembled from the central utensil shown in FIG. 2 and the accessory shown in FIG. 3.

FIG. 4 shows a perspective view of a food processing utensil 100 assembled from the central utensil shown in FIG. 2 and the accessory shown in FIG. 3. Food processing utensil 100 includes a stirring and cutting accessory 120 securely mounted on central utensil 110, in accordance with one embodiment.

Spindle 119 of central utensil 110 allows transfer of torque from the motor of the food processor to both the central utensil 110 and the coupled accessory 120.

In various embodiments, the various blades on the central utensil and/or accessory may be of different shapes and sizes, and oriented in different angles relative to the base of the bowl: each one may be adjusted for processing different types of food, in accordance with different embodiments.

The combinations of the different blades in several heights and optionally their shape and positions along the circumference of the processing device enhance the ability of the cutting blades to chop and grind food such as but not limited to: coffee, beans, sugar, chickpeas, nuts, vegetables, fruits, leaves, herbs such as parsley and coriander, spices, wheat weed, flax seeds, peanuts, sprouts, pomegranate seeds, chocolate, and hard cheese.

Note, for example in FIG. 1, that the pair of blades 17α', 17β' of the central utensil 10' are not at the same height, the right blade 17β' being lower than the left blade 17a, and may have slightly or significantly different contours. Similarly, the pair of blades 127bα, 12bβ of the accessory 120 may be arranged so that one is higher than the other, as well as perhaps having different contours. The other pair of blades 127aα and 127aβ of the accessory 120, positioned above all the other blades in the device 100, although both flat horizontal bases being positioned at the same height in these particular embodiments, may be differently angled, such that the free end of one is significantly farther away from the axis of rotation A than the other is.

The contours of the blades may each be custom designed to fulfill a different task, and yet be functionally synergic. For example, some of the blades may be contoured so that when the device 100 rotates, the blades push the food proximal to the blades upward, whereas some of the other blades push the food proximal to them downwards. The food may thus be bounced back and forth between different blades, each blade cutting the food in a unique direction.

The vertical distance between proximal blades along the rotational axis is typically short in various embodiments, such that the distance is less than 10 mm, preferably 8-9 mm or less. Such short distances may assist in uniform cutting even when operating the food processor for mere seconds.

The wings and paddles may be positioned at different heights (not shown) or angles relative to each other, and the blades may also be less than 10 mm above an adjacent blade. Yet in some embodiments the blades are at the same height.

Blades 127a are at a different angle with respect to the rotational axis A, as compared to blades 127b. Blades 127b, however, are at a more similar angle to blades 117 (relative to rotational axis A). In other embodiments (not shown), blades 127b and 117 may have entirely different angles. The variety of angles allows for example cutting food into a different size for each blade, which may allow synergic finer and faster chopping for example. Since the food is efficiently and quickly moved between blades, uniform cutting is achieved at even short operation times.

Generally, for purposes of maintaining balance of the device during operation of the food processor, it may be preferable that the blades be arranged in somewhat similarly sized blade sets suitably positioned on the food processor utensil to maintain balance, for example by placing equal twin blades opposite each other on the food processor utensil. However, in some embodiments sets of similar shaped blades may have different lengths for example, to allow efficient cutting for example. Similarly, in the same or other embodiments, there may be sets of similarly sized yet differently shaped blades. To maintain balance of the food processor utensil 100 and minimize strain, due to the geometrical differences between the blades in each pair, the blades may be differently sized, in their width or thickness, for example.

In some embodiments (not shown), there are more than two blades of similar angles, shapes and sizes, proximal to each other along the axis of rotation, in either or both of the utensil and the accessory. In such embodiments, the similar blades may be fairly equidistant from each other, or otherwise positioned on the food processor utensil to help maintain balance, and compensations may be made for different contours, angles etc., again to improve the performance of the device.

Wings 124a are typically long arc-shaped structures, typically made of plastic, extending out from and fused with or molded with body 122 and inclined preferably about 30-15° from the rotation axis A, whereas paddles 124b are typically plastic triangular structures with their base fused with the body 122, the angles of the base being preferably roughly about 85°.

According to one embodiment the device is used for whisking, by filling a bowl with food preparation (not shown) such that when the device rotates, the paddles 124a are submerged or at least immersed in the food preparation, whereas the wings 124b are at least partially exposed to air.

The device may be so efficient that it could take mere seconds to achieve the desired whipping of the food preparation.

For example, a device 100 including the following structural features may be used: the wings 124a each extend about 6 mm from the body 122 and have an arc length of about 9 mm and an incline of roughly 30', the paddles 124b are each about 5 mm high; the exemplary device 100 has number of blades and the blades have a configuration and contours as shown in the FIGS. 2, 3 and 4, and the bowl (not shown) has an inside diameter of about 120 mm, the blades' free ends reaching to about 9-3 mm from the walls of the bowl. Such device was found to achieve good whipping in a few seconds by being rotated at between roughly 1000 to 3000 rounds per minute (rpm), most preferably at around 2000 rpm.

The level of the top of paddles 124b should correspond with the level of the bottom of the wings 124a or there should be an overlap of the levels, such that there is no layer between the paddles 124b and wings 124a that is not worked upon by the paddles 124b or the wings 124a.

Without being bound by theory, it is thought that in operation of the device 100, the paddles 124b allow food preparations to transport outwards towards the bowl walls, and the wings cause the food preparation or air (depending on the type and/or level of the food preparation) to transport downwards proximal to the walls of the bowl, due to their geometry. The wings 124a and paddles 124b are thus thought to cooperate to assist in whipping or circulating the food preparation to produce homogeneously whipped and/or uniformly cut food preparations. Top blades 127a$\alpha$, 127a$\beta$ may also assist in whipping due to their relatively vertical orientation.

When whipping is not desired, a user may for example fill in the bowl with preparation only until below the paddles 124b, or alternatively above the wings 124a, or use a different embodiment that lacks wings, and/or select a non-optimal rotation speed on the food processor.

The accessories may comprise both blades or other cutting means, and paddles, and wings or other circulating means. Other accessories may comprise fewer elements, for example an accessory suitable for use with a central utensil shown in FIG. 2 may include only wings.

Figure 5:
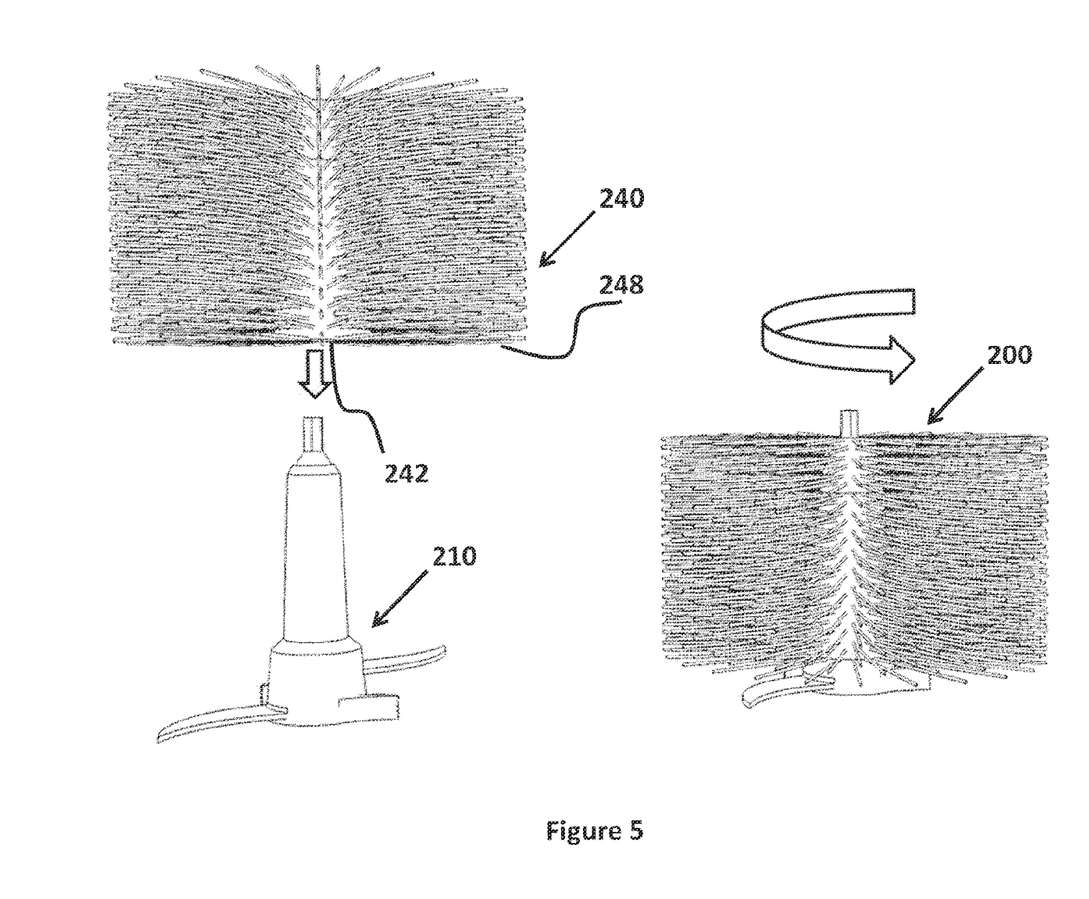
FIG. 5 shows a cleaning device that includes a brush accessory capable of being mounted on a central utensil, in accordance with one embodiment.

Reference is now made to FIG. 5 illustrating two views of a cleaning Device 200 that includes a brush accessory 240 that is capable of being mounted on central utensil 210, in accordance with one embodiment. Brush accessory 240 has a central cylindrically shaped tube 242 configured to be securely mounted on central utensil 210 wherein the cylindrical tube is provided with a plurality of flexible bristles 248. The bristles 248 preferably have lengths sufficient to enable them to reach the walls of the bowl. During rotation of central utensil 210, the bristles 248 on brush accessory 240 clean the food processor bowl (not shown in the figure). The bristles 248 may be made from various suitable materials such as polyester, plastic etc., which are for example non-toxic, abrasion resistant, supple and suitably stiff.

In other embodiments (not shown), a cleaning device can be made as a single non-separable unit.

Figure 6:
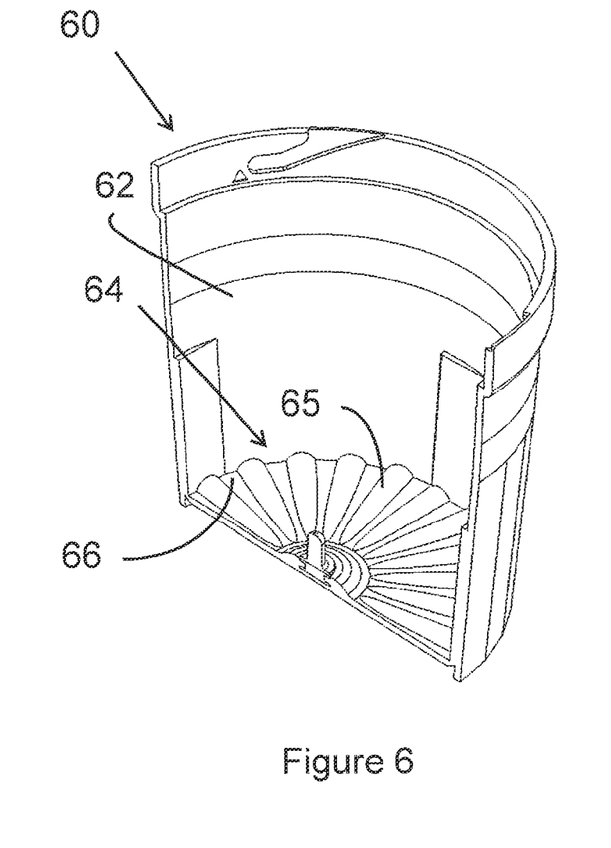
FIG. 6 shows a food processing bowl suitable for use with the devices shown in the previous figures.

FIG. 6 shows a food processing bowl 60 that also has a wavy structure 64, on the bottom 63 of the bowl 60, the structure being configured to assist in cutting the preparation. The wavy structure 64 includes alternate ridges 65 and depressions 66 extending from the centre of the bottom 63 to the wall 62.

The bowl 60 may be particularly suitable for devices in which the free end (end distal from the axis or rotation) of at least one blade is no more than 5 mm away from the wall 62 of the bowl 60, preferably about 3 mm away. Furthermore, it may be particularly suitable for utensils in which the lowest blade, 117$\beta$ in FIG. 4, at least partially conforms with the shape of the bowl, such as is slightly inclined towards the bottom 63 of the bowl 60, at least partly along the blade 117$\beta$ or at the free end, such that at least part of the blade 117$\beta$ is 5 mm or less distant from the bottom 63. Such configurations are believed to improve the cutting capabilities of the food processor. The bowl is particularly useful for some food preparations that are difficult to process, such as ice cubes and herbs (parsley for example) that in commercially available food processors tend to either linger or get tangled in the blades or between the blades and the bottom of the bowl.

Figure 7A:
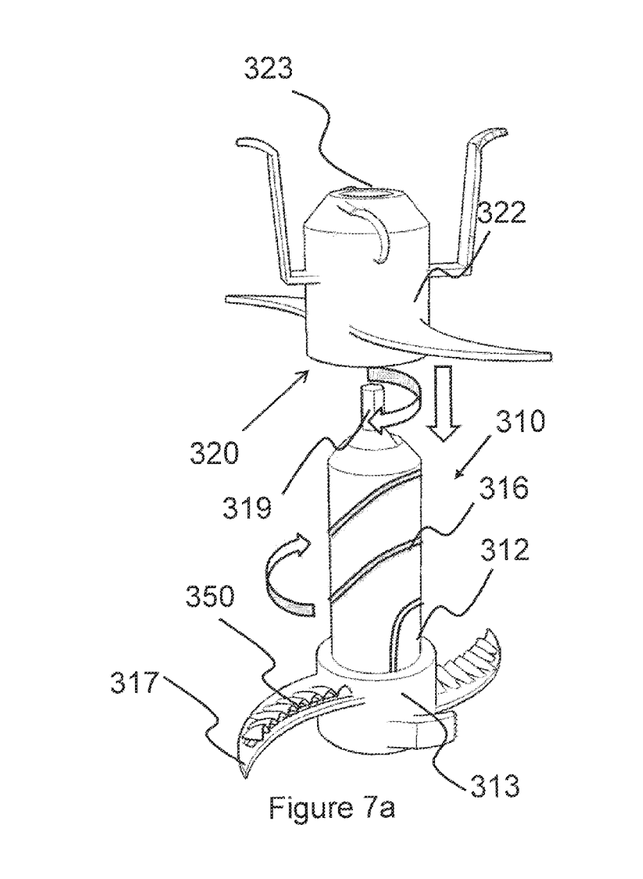
FIG. 7a is a perspective view showing an accessory capable of spirally descending on a central utensil during operation of a food processing apparatus.
Figure 7B:
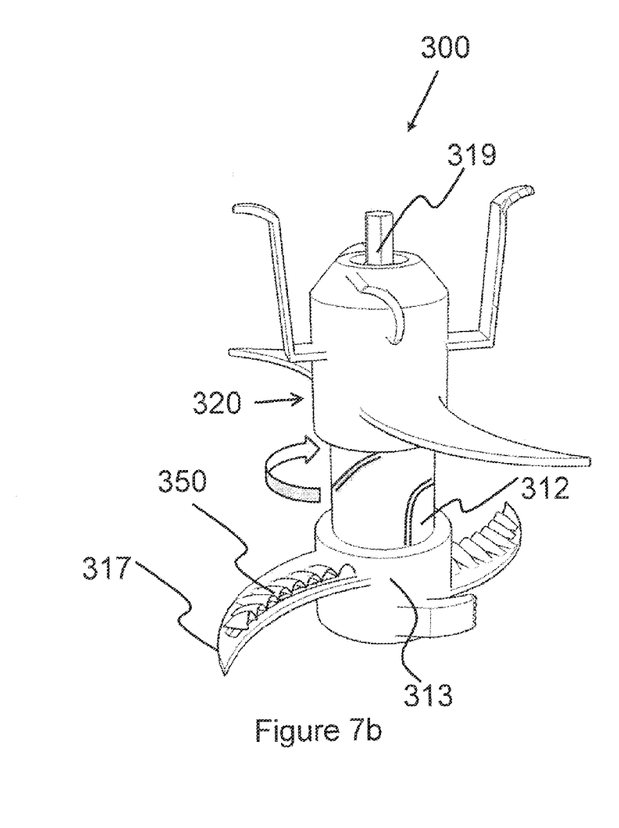
FIG. 7b shows a device including the accessory mounted on the central utensil.
Figure 7C:
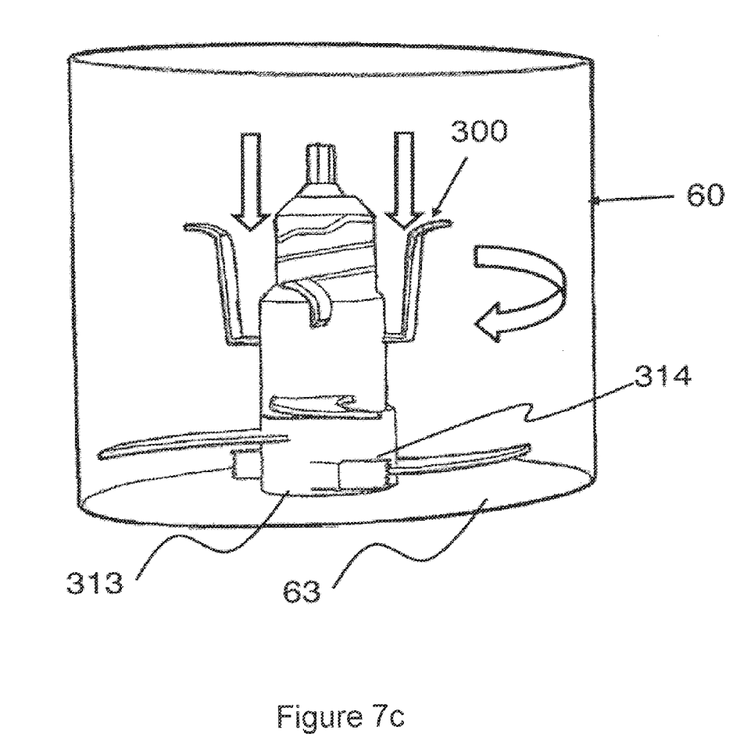
FIG. 7c shows the device spinning in a food processing bowl and cutting a food preparation.

Reference is now made to FIGS. 7a-c illustrating a food processing utensil 300 that includes a cutting accessory 320 capable of downwardly sliding on the shaft 312 of a central utensil 310, in accordance with yet another embodiment.

The shaft 312 is positioned to receive rotational power via spindle 319 from a motor of a food processor (not shown in the figures). The base 313 of the utensil 310 is placed on the bottom 63 of a food processor bowl 60 (the food processor itself is not shown in the figures).

Shaft 312 is provided with spiral slit 316 running along and around the shaft 312 in a screw fashion. Spiral slit 316 enables accessory 320 to roll down in circles along shaft 312 at a predetermined velocity.

The shaft 312 also has one or more paddles 314 capable of assisting in mixing the food preparation in the bowl 60.

Shaft 312 is further equipped with one or more cutting blades 317 on base 313. Cutting blades 317 are capable of chopping wet and dry food including but not limited to meat and fish and may be capable of crushing ice.

Cutting blades 317 of the utensil 310 are equipped with a plurality of elevations 350 which may help whipping food such as eggs, cream.

The cutting and stirring accessory 320 capable of sliding on central shaft 312 has a cylindrically shaped body 322 with an opening 323 for spirally sliding down on shaft 312.

The accessory 320 is equipped with at least one corresponding protrusion (not shown in the figure) that corresponds to the spiral slit 316 for engaging within the slit 316 while guiding the accessory 320 downwards.

Central shaft may be positioned on top of the bottom 63 of bowl 60. Accessory 320 may then be positioned on top of shaft 312 to engage with the slit 316. After positioning the accessory 320, spindle 319 may be coupled to a motor of a food processor (not shown). A food preparation is typically added to the bowl 60 after accessory 320 is positioned on the shaft 312.

During rotation of the shaft 312, the accessory 320 slides down in rotational movement along the spiral slit 316 similar to a ring moving on a bolt. When accessory 320 reaches the bottom of the slit 316, the accessory 320 is engaged and securely locked to the utensil 310. The preparation is thus cut and chopped from top to bottom.

Note that the slit thread in some embodiments descends clockwise as viewed from the top of the device 300 (as shown in FIGS. 7a and 7b), and in other embodiments (not shown) anti-clockwise. Devices coupled to a motor that rotates the central utensil in the same direction as that of the thread will allow the accessory to travel more slowly down the utensil 310. The time that passes between turning on the food processor and accessory 320 reaching the base 313 of the utensil 310 also depends upon the pitch of the thread of the slit 316.

Figure 8A:
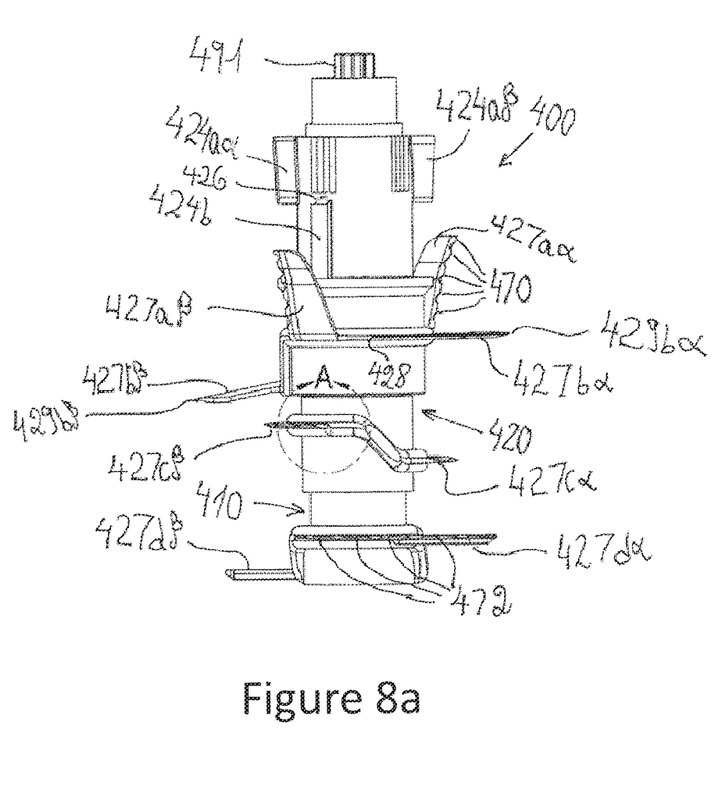
FIG. 8a illustrates a food processing utensil wherein some of the blades have teeth and flaps.
Figure 8B:
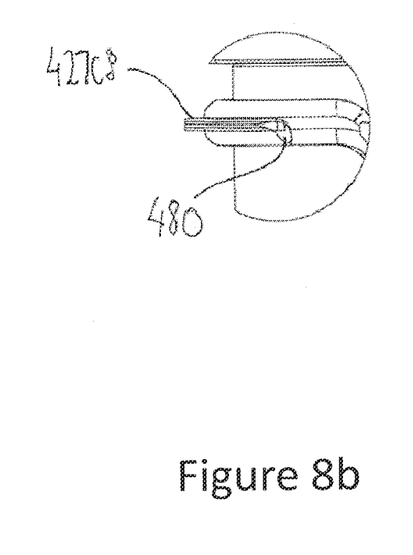
FIG. 8b shows an expanded view of a blade with a flap.

FIG. 8a illustrates a food processing utensil embodiment 400 wherein some of the blades have teeth 471, 472 and flaps 480, and FIG. 8b shows an expanded view of a blade 427cβ with a flap 480.

The teeth 471 are readily apparent in the top pair of blades 427aα, 427aβ but there are teeth 472 also on the bottom pair of blades 427dα, 427dβ.

The embodiment 400 fits into a food processor for concomitantly stirring, whipping and chopping food preparations, the food processor (not shown) comprises: a correspondent motor, a correspondent bowl with a bottom and walls, and a food processing utensil 400 includes an accessory 420, which has two paddles (only 424bα visible); two wings 424aα, 424aβ; top cutting blades 427aα, 427aβ; cutting blades 427bα, 427bβ, 427cα, 427cβ.

The central utensil 410 onto which the accessory 420 is threaded includes cutting blades 427dα, 427dβ.

The paddles 424b, blades 427 and wings 424a are coupled to the central utensil 410 and configured such that when the bowl is filled with a food preparation to at least the level of the paddles, and the central utensil 410 is coupled to the motor and the bowl and then rotated in the food preparation around a rotational axis, the food is uniformly cut and/or whipped. Notably, the top blades 427a are partially vertical and reach up to a level above the bottom of the paddles 424. In similar embodiments they reach up to the wings. When a food preparation is placed in the bowl up to the level of the paddles, all of the blades as well as the paddles contact the preparation, each performing its own function on the food preparation— coarse chopping, fine chopping, stirring, etc. In particular, the top blades 427a may, in addition to the wings 424a, assist in the whipping, as well as cutting the food in a more vertical direction than the other blades. The paddles 424b may also assist in whipping, by the food preparation being anywhere between just below the level of the bottom of the paddles and the top of the paddles. The paddles may move both air and food radially outward to the walls, and the wings push the air downwards. Together, air may pass through the food preparation in a cyclone-like movement, thereby both aerating and circulating the food preparation.

Whipping and/or cutting may be particularly uniform when the food preparation is filled to just below the wings. Note that the free ends of the top blades 427a extend to a level in the bowl closer to the open top than to the bottom of the bowl (not shown)—the top is roughly at the level of the spindle 491. Overall, the eight blades occupy most of the span of the walls of the bowl, so that even when a fairly sizeable food preparation is placed in the bowl, the cutting is uniform. In fact, the food processor may provide best results with such sizes of food preparations. The high effective loading capacity is in stark contrast to many commercial food processors equipped with blades positioned in the lower portion of the bowl, that cannot effectively chop or otherwise process the levels of the food preparation that are far above the blades. In similar embodiments, even more blades are situated on the central utensil and/or accessory, which may help to decrease the cutting time or even further improve the uniformity of the preparation.

Although not apparent in the perspective view of FIG. 8a, the top blades 427a are not identical. One has an incline angle of 20° from the rotational axis, whereas the other has an angle of 27°. In general the angles may be between 10 and 40°.

The blades each have a fixed end 428. Note that blades 427bα, 427bβ are twin blades of very similar form (similar to that of blades 127bα and 127bβ in FIG. 4); however they are at different levels. Moreover, blade 427bα has the free end 429bα and the fixed end 428 equidistant to the bowl bottom, whereas blade 427bβ has the free end 429bβ closer than the fixed end (not visible) to the bowl bottom. Preferably, the downward inclining blades are inclined at an angle of roughly 95 to 100° to the rotation axis.

Preferably, the free end of at least the lowest blade 427dβ is no more than 5 mm away from the walls and bottom.

The wings 424a may be roughly 50-15° from the rotational axis; the paddles have a triangular structure, preferably an isosceles triangle having a vertex angle 426 of roughly 60-100°, most preferably around 80°.

The wings 424a are preferably inclined roughly at 50-15° from the rotational axis.

The wings each preferably extend at least 2 mm from the body; have an arc length of at least 5 and an incline of roughly 15 to 50°, and the paddles each have a height of at least 2 mm.

The tops of the paddles 424b correspond with the bottoms of the wings 424a. However, in similar embodiment they are above the bottoms of the wings.

Referring to an exploded view of part of blade 427cβ, the bottom blades of the accessory 427cα and 427cβ each comprise a flap 480 inclined toward the bowl bottom (which is not shown). The flaps 480 typically are inclined at an angle of 95-120° to the rotation axis. The flaps 480 may help to dislodge big particles below their blades, and create a lift on the blades to which they are attached similar to the effect of flaps on airplane wings.

In particular, the accessory 420 may comprise at least one spring (not shown) within the accessory 420, the spring allowing the accessory to move along the rotation axis upon contact of at least one accessory blade with a food preparation. The flaps 480 may help to lift the blade, and the blade thereafter can return to a lower position. Thus the blades and paddle of the accessory may operate at varying levels of the food preparation, lending further homogeneity to the food preparation. Note that a common problem of food processors is that the utensils may be pushed upwards by the food preparation until a cover over the bowl top may be damaged. This damage may be avoided by having the spindle 491 is proximal to the open top of the bowl, i.e. the motor is positioned above the bowl top, and its weight prevents the accessory from excessively rising. Blades with flaps may be substantially wider than the blades not equipped with flaps, so at to allow larger lift.

The free ends of some of the blades may have a tangent at the cutting edge of their radially outer end that forms an angle of between 0 and 20° with the tangent of the wall adjacent to the radially outer end. Such are the blades 127b, 27b shown in FIG. 4.

Some of the blades may have ledges next to the cutting edge of the blade, as blades 127b, 27b shown in FIG. 4 have. The ledges may form an elevation over the rest of the blade (behind the cutting edge), to lend reduced resistance of the blades to movement in the direction of the spinning of the utensil 100.

The food processor is configured to allow rotation of the central utensil sufficiently fast to whip the food preparation.

For example, the motor is capable of variable speed. For food processor with a bowl with an inner diameter of about 11 cm and a corresponding utensil having a configuration similar to the embodiment in FIG. 8a, best whipping results are obtained by stirring for a few seconds at 1500 rpm, then stirring at 2000 rpm. A stiff meringue may be obtained within about 30-40 s, whereas most egg white beaters and whippers require at least 90 s to obtain similar products. Similarly, about 150 g of coffee beans can be grinded within 30-40 s. Whipped cream may be prepared at 1000 rpm within about 20 to 25 s, and evenly cut salad at that rpm in typically 2 s.

The bottom of the bowl may have an opening that can be selectively closed, for easy removal of food and cleaning of the bowl. Some of the blades of the processor may be configured to help removing/cleaning the food from the bowl.

Such bowls may be placed in cabinets wherein which there are cleaning apparatus that may include cleaning liquid, waste etc tubing, and other accessories to facilitate cleaning and emptying.

One of the advantages of embodiments described above is that for various food preparations a very short operation time, typically a few seconds, may be required to obtain excellently uniform food. In addition, the food may be very finely cut, whipped and/or chopped within a very short time, for example it may require several seconds only to produce finely powdered sugar from sugar cubes. In particular, very short operation of the devices described above may produce more coarsely cut material, yet it has been found that even so, the material is very uniformly cut.

The uniform cutting is attributed to the unique configurations of the devices described above, namely particular synergic cutting and circulating element configurations for food processors.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. A food processor for concomitantly stirring, whipping and chopping food preparations, the food processor comprising:
a motor,
a bowl with an open top, a bottom and walls, and
a food processing utensil, the food processing utensil comprising:
at least one paddle;
at least one wing;
at least one cutting blade, the cutting blades having free ends, and
a central utensil comprising:
a two-ended shaft and a base, the shaft culminating on a first end with a spindle operationally coupled to said motor and connected on the second end to a base coupled to said bowl, the paddles, blades and wings coupled to said central utensil; and-configured such that when the bowl is filled with a food preparation to at least a level of the paddle, and the central utensil is coupled to the motor and then rotated in the food preparation around a rotational axis, the food is uniformly cut and/or whipped
at least one cutting and/or stirring and/or whipping accessory, wherein each of the accessories comprising a body and at least one of the elements; blade, paddles and wings, wherein each of the accessories and central utensil further comprising means to securely couple each accessory to the central utensil.

2. The food processor of claim 1, configured to allow uniform whipping and/or cutting when the food preparation is just below the wings.

3. The food processor of claim 1, wherein at least one blade is geometrically different from other blades of the food processor.

4. The food processor of claim 1, wherein the free end of at least a lowest blade is no more than 5 mm away from the walls and bottom.

5. The food processor of claim 1, wherein the wings are long arcuate structures, extending out from the food processing utensil.

6. The food processor of claim 1, the wings being inclined roughly 50-15° from the rotational axis.

7. The food processor of claim 1, wherein tops of the paddles correspond with or are above the level of bottoms of the wings.

8. The food processor of claim 1, wherein the blades comprise a set of top blades, each top blade comprising a flat horizontal base and a free end extending away from the bottom of the bowl and at least to the paddles.

9. The food processor of claim 8, wherein the top blades extend to the wings.

10. The food processor of claim 8, wherein the angles of the top blades relative to the axis of rotation are different from each other.

11. The food processor of claim 1, wherein at least one blade comprises teeth.

12. The food processor of claim 1, wherein each of the blades has a fixed end, and wherein at least one blade has the free end closer than the fixed end to the bowl bottom.

13. The food processor of claim 1, wherein the motor is configured to allow rotation of the central utensil sufficiently fast to whip the food preparation.

14. The food processor of claim 13, wherein the motor is capable of variable speed.

15. The food processor of claim 1, wherein the wings are arc-shaped structures, extending out from the body.

16. The food processor of claim 1, wherein the puddles are triangular structures extending out from the body.

17. A food processor for concomitantly stirring, whipping and chopping food preparations, the food processor comprising:
    a motor,
    a bowl with an open top, a bottom and walls, and
    a food processing utensil, the food processing utensil comprising:
        at least one paddle;
        at least one wing;
        at least one cutting blade, the cutting blades having free ends, and
        a central utensil comprising:
    a two-ended shaft and a base the shaft culminating on a first end with a spindle operationally coupled to said motor and connected on the second end to a base coupled to said bowl, the paddles, blades and wings coupled to said central utensil; and-configured such that when the bowl is filled with a food preparation to at least a level of the paddle, and the central utensil is coupled the motor and then rotated in the food preparation around a rotational axis, the food is uniformly cut and/or whipped, wherein the bottom of the bowl has a wave-like structure.

* * * * *